United States Patent
Runyon et al.

(10) Patent No.: US 11,374,928 B2
(45) Date of Patent: Jun. 28, 2022

(54) SECURITY SERVICE, COMMISSIONING, SELF-SERVICE, AND AREA OWNER MANAGEMENT

(71) Applicant: Intel Corporation, Santa Clara, CA (US)

(72) Inventors: Jeff Runyon, Queen Creek, AZ (US); Donald Males, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 1018 days.

(21) Appl. No.: 15/969,283

(22) Filed: May 2, 2018

(65) Prior Publication Data
US 2019/0044941 A1 Feb. 7, 2019

(51) Int. Cl.
*H04L 9/40* (2022.01)
*G08B 25/01* (2006.01)
*G06F 3/0482* (2013.01)

(52) U.S. Cl.
CPC ........ *H04L 63/0861* (2013.01); *G06F 3/0482* (2013.01); *G08B 25/016* (2013.01); *H04L 63/10* (2013.01); *H04L 63/20* (2013.01)

(58) Field of Classification Search
CPC ... H04L 63/08; H04L 63/083; H04L 63/0861; H04L 63/10; H04L 63/20; G08B 25/014; G08B 25/016; G08B 25/08; G06F 3/0482
See application file for complete search history.

(56) References Cited

U.S. PATENT DOCUMENTS

| | | | | |
|---|---|---|---|---|
| 7,113,090 B1* | 9/2006 | Saylor | ............. | G08B 13/19682 340/5.33 |
| 2006/0232399 A1* | 10/2006 | Martin | ................. | G08B 25/008 340/539.16 |
| 2014/0172957 A1* | 6/2014 | Baum | .................... | G08B 25/08 709/203 |
| 2018/0248015 A1* | 8/2018 | Glass | ...................... | H01L 29/78 |
| 2019/0289134 A1* | 9/2019 | Dawes | .................... | H04L 63/20 |

OTHER PUBLICATIONS (Setup Guide—Smart Hub Panel, Vivint, 2016.*
Siswanto et al., Biometric Fingerprint Architecture for Home Security System, 2016.*
Wikipedia, "Selfie", wikipedia.org, retrieved Apr. 17, 2018, 7 pages.
alarm.com, "Interactive Security: Home alarm monitoring systems from Alarm.com", alarm.com, retrieved Apr. 17, 2018, 5 pages.

* cited by examiner

*Primary Examiner* — Minh Dinh
(74) *Attorney, Agent, or Firm* — Jordan IP Law, LLC (57) ABSTRACT

An embodiment of a semiconductor package apparatus may include technology to establish communication with a security asset, establish communication with a security access control system, retrieve one or more tasks from the security access control system to one of commission or service the security asset, and guide a user to perform the one or more tasks. Other embodiments are disclosed and claimed.

25 Claims, 8 Drawing Sheets

SECURITY SERVICE, COMMISSIONING, SELF-SERVICE, AND AREA OWNER MANAGEMENT

TECHNICAL FIELD

Embodiments generally relate to security systems. More particularly, embodiments relate to security service, commissioning, self-service, and area owner management.

BACKGROUND

Conventionally, performing service or commissioning security devices is a manual and labor-intensive process. A photo identification conventionally requires going to the issuing authority to provide a photo or get a picture taken. A room owner may conventionally have to request a security department to set up appropriate access and configuration of their room's security features.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
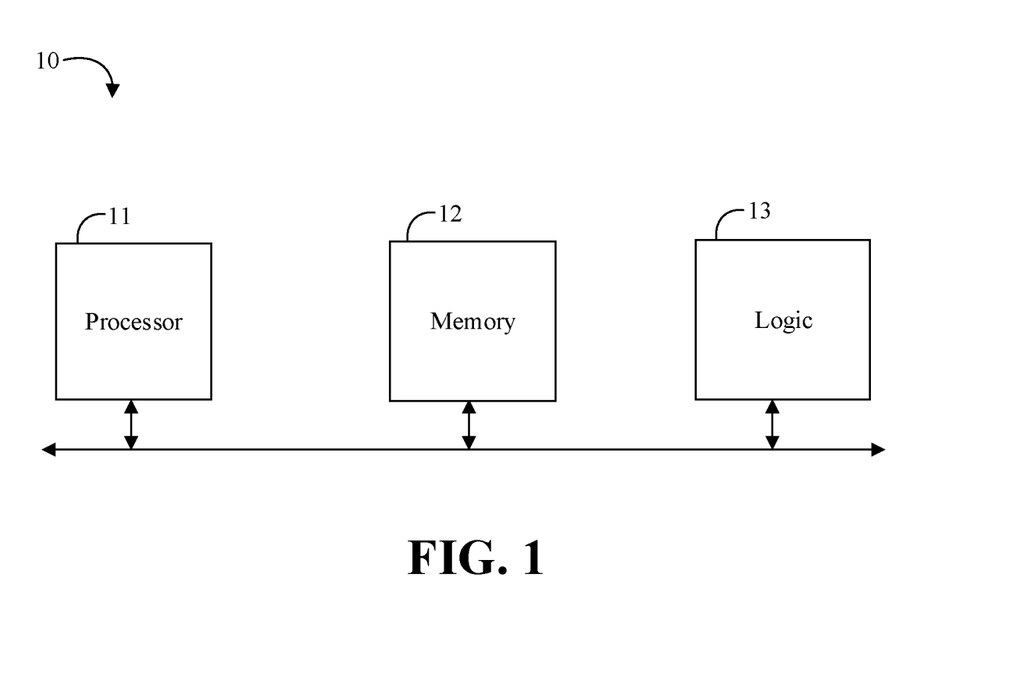
FIG. 1 is a block diagram of an example of an electronic processing system according to an embodiment.

Turning now to FIG. 1, an embodiment of an electronic processing system 10 may include a processor 11, memory 12 communicatively coupled to the processor 11, and logic 13 communicatively coupled to the processor 11 to establish communication with a security asset, establish communication with a security access control system, retrieve one or more tasks from the security access control system to one of commission or service the security asset, and guide a user to perform the one or more tasks. For example, the logic 13 may be configured to provide a user interface to visually display information related to the one or more tasks, and prompt the user to perform the one or more tasks with the user interface. In some embodiments, the logic 13 may additionally, or alternatively, be configured to prompt the user to collect personal identification information, and store the collected user identification information at the security access control system. For example, the personal identification information may include one or more of image information (e.g., a selfie) and/or biometric information (e.g., fingerprint information, facial identification information, etc.). In some embodiments, the logic 13 may additionally, or alternatively, be configured to identify an owner for a security area, expose one or more attributes of the security area for management by the owner, and provide a user interface for the owner to modify the one or more attributes of the security area. For example, the one or more attributes may include one or more of access behaviors, event configurations, and action messages. In some embodiments, the logic 13 may be located in, or co-located with, various components, including the processor 11 (e.g., on a same die).

Embodiments of each of the above processor 11, memory 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the memory 12, persistent storage media, or other system memory may store a set of instructions which when executed by the processor 11 cause the system 10 to implement one or more components, features, or aspects of the system 10 (e.g., the logic 13, guiding the user to perform the service/commissioning tasks, collecting the personal identification information, managing the owner's security area, etc.).

Figure 2:
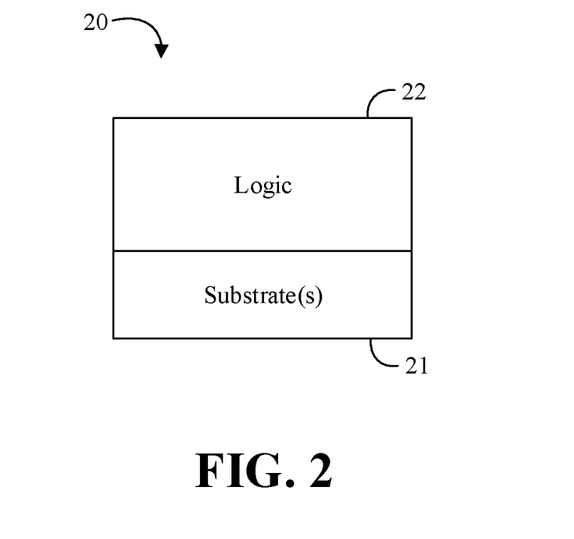
FIG. 2 is a block diagram of an example of a semiconductor package apparatus according to an embodiment.

Turning now to FIG. 2, an embodiment of a semiconductor package apparatus 20 may include one or more substrates 21, and logic 22 coupled to the one or more substrates 21, wherein the logic 22 is at least partly implemented in one or more of configurable logic and fixed-functionality hardware logic. The logic 22 coupled to the one or more substrates 21 may be configured to establish communication with a security asset, establish communication with a security access control system, retrieve one or more tasks from the security access control system to one of commission or service the security asset, and guide a user to perform the one or more tasks. For example, the logic 22 may be configured to provide a user interface to visually display information related to the one or more tasks, and prompt the user to perform the one or more tasks with the user interface. In some embodiments, the logic 22 may additionally, or alternatively, be configured to prompt the user to collect personal identification information, and store the collected user identification information at the security access control system. For example, the personal identification information may include one or more of image information (e.g., a selfie) and/or biometric information (e.g., fingerprint information, facial identification information, etc.). In some embodiments, the logic 22 may additionally, or alternatively, be configured to identify an owner for a security area, expose one or more attributes of the security area for management by the owner, and provide a user interface for the owner to modify the one or more attributes of the security area. For example, the one or more attributes may include one or more of access behaviors, event configurations, and action messages. In some embodiments, the logic 22 coupled to the one or more substrates 21 may include transistor channel regions that are positioned within the one or more substrates 22.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

The apparatus 20 may implement one or more aspects of the method 30 (FIGS. 3A to 3C), or any of the embodiments discussed herein. In some embodiments, the illustrated apparatus 20 may include the one or more substrates 21 (e.g., silicon, sapphire, gallium arsenide) and the logic 22 (e.g., transistor array and other integrated circuit/IC components) coupled to the substrate(s) 21. The logic 22 may be implemented at least partly in configurable logic or fixed-functionality logic hardware. In one example, the logic 22 may include transistor channel regions that are positioned (e.g., embedded) within the substrate(s) 21. Thus, the interface between the logic 22 and the substrate(s) 21 may not be an abrupt junction. The logic 22 may also be considered to include an epitaxial layer that is grown on an initial wafer of the substrate(s) 21.

Figure 3A:
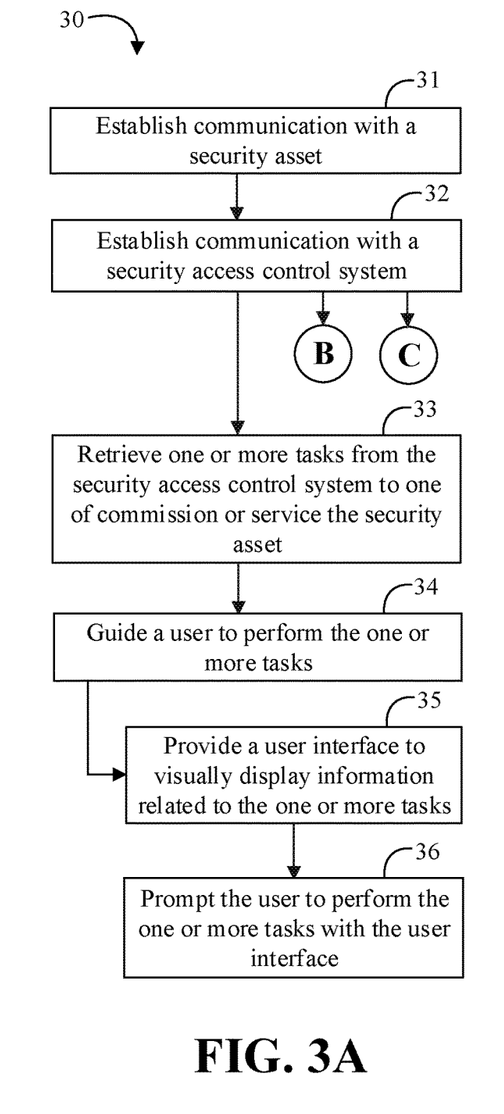
FIGS. 3A to 3C are flowcharts of an example of a method of managing a security asset according to an embodiment.
Figure 3B:
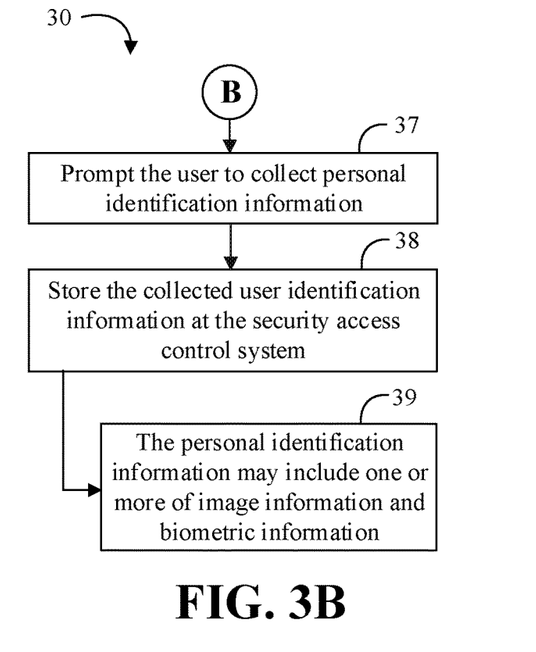
Figure 3C:
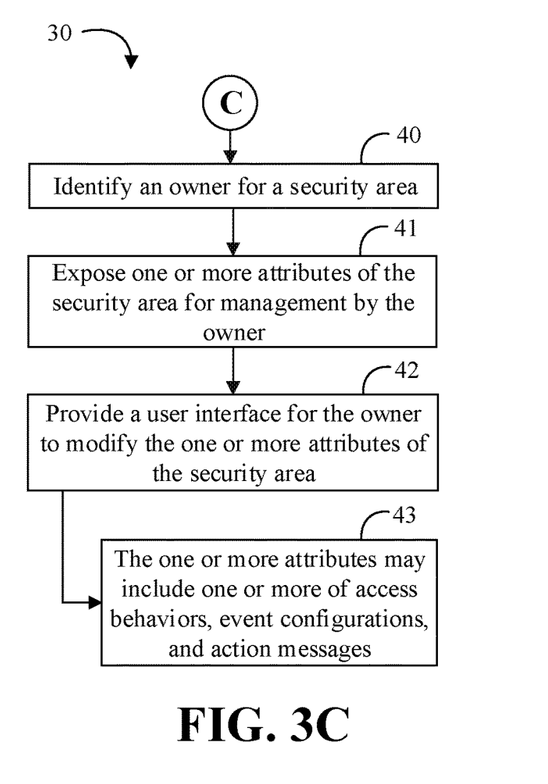

Turning now to FIGS. 3A to 3C, an embodiment of a method 30 of managing a security asset may include establishing communication with a security asset at block 31, establishing communication with a security access control system at block 32, retrieving one or more tasks from the security access control system to one of commission or service the security asset at block 33, and guiding a user to perform the one or more tasks at block 34. For example, the method 30 may include providing a user interface to visually display information related to the one or more tasks at block 35, and prompting the user to perform the one or more tasks with the user interface at block 36.

Some embodiments of the method 30 may additionally, or alternatively, include prompting the user to collect personal identification information at block 37, and storing the collected user identification information at the security access control system at block 38. For example, the personal identification information may include one or more of image information and biometric information at block 39.

Some embodiments of the method 30 may additionally, or alternatively, include identify an owner for a security area at block 40, exposing one or more attributes of the security area for management by the owner at block 41, and providing a user interface for the owner to modify the one or more attributes of the security area at block 42. For example, the one or more attributes may include one or more of access behaviors, event configurations, and action messages at block 43.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 30 may be implemented on a computer readable medium as described in connection with Examples 20 to 25 below. Embodiments or portions of the method 30 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 4:
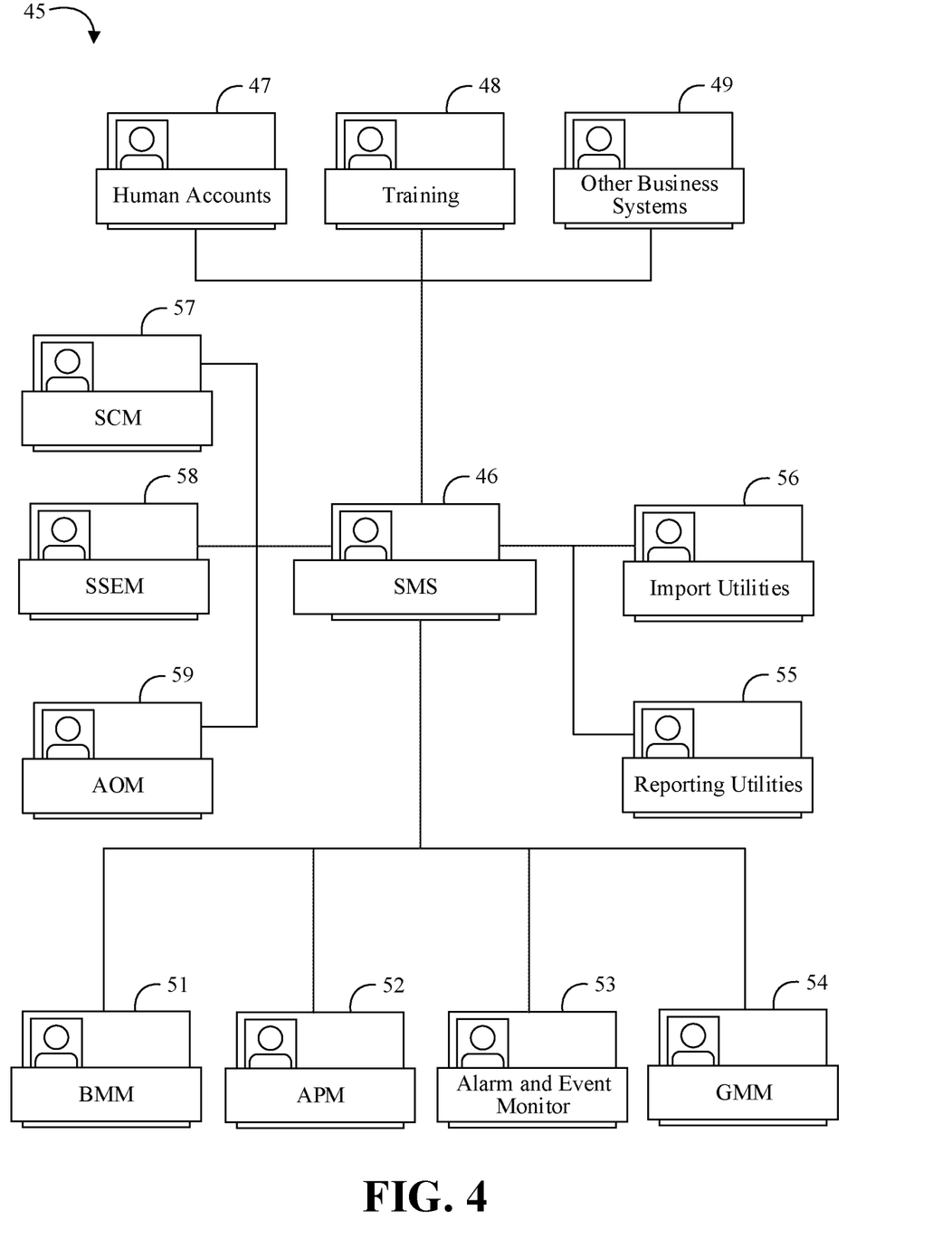
FIG. 4 is a block diagram of an example of a security access control system according to an embodiment.

Turning now to FIG. 4, an embodiment of a security access control system 45 may include a security management system (SMS) 46 communicatively coupled to multiple business modules including, for example, a human accounts module 47 (e.g., employees, contract workers, vendors, etc.), a training module 48, and other business system modules 49 (e.g., a real estate module, a payment module, etc.). The SMS 46 may also be communicatively coupled to multiple security modules including, for example, a badge management module (BMM) 51, an access provisioning module (APM) 52, an alarm and event monitor module 53, and a guest management module (GMM) 54. The SMS 56 may further include various administration modules and/or utilities include a reporting utilities module 55, an import utilities module 56.

The system 45 may further include a service and commissioning module (SCM) 57 communicatively coupled to the SMS 46. For example, the SCM 57 may cooperate with one or more of the other modules, as may be coordinated by the SMS 46. For example, the SCM 57 may provide a simple software interface that may prompt a user through performing a commissioning or service task, connect natively to the device being tested or serviced, and/or create an automated audit trail for all tasks performed.

The system 45 may further include a security self-service enrollment module (SSEM) 58 communicatively coupled to the SMS 46. For example, the SSEM 58 may cooperate with one or more of the other modules, as may be coordinated by the SMS 46. For example, the SSEM 58 may prompt the user to collect personal identification information (e.g., a selfie, fingerprint information, facial identification information, etc.), and store the collected user identification information at the security access control system.

The system 45 may further include a security area owner module (AOM) 59 communicatively coupled to the SMS 46. For example, the AOM 59 may cooperate with one or more of the other modules, as may be coordinated by the SMS 46. For example, the AOM 59 may identify an owner for a security area, expose one or more attributes of the security area for management by the owner, and provide a user interface for the owner to modify the one or more attributes of the security area.

Embodiments of the SCM 57, the SSEM 58, the AOM 59, and other components of the system 45, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

Security Service and/or Commissioning Examples

Some embodiments may advantageously provide a security service and commissioning module. Conventionally, performing service or commissioning security devices is a manual and labor-intensive process. Within the security access control industry, there is typically not any automated way to commission new devices or effectively troubleshoot device malfunctions. For example, when a new device (e.g., badge reader, intrusion detection, etc.) is added to a system, the system owner typically relies on the installer to confirm that it is working properly. Within organizations where more controls have been introduced, the installer may perform a checklist of test items to confirm correct functionality. The installation/test may be followed by the organization's representative witnessing the same functional test to confirm that the device is commissioned and ready to be activated. The entire process is manual and very labor intensive.

When fitting up a new building or campus Security Access Control System the commissioning process can add weeks of labor and coordination overhead to the project. First, someone manually creates the test cases and device logs. Next, there is the overhead of two identical tasks being performed for "Functional Acceptance Test" by the installer and "Owner Acceptance Test" (OAT) by the facility representative. The overhead may also include the coordination of schedules on these steps and if the OAT fails, both steps need to be repeated until successful. Finally, the test logs, history logs, device serial numbers, etc. need to be correlated and archived for warranty and to allow invoicing to happen to close out the project.

Conventional service on a faulty device introduces similar manual processes and excessive labor overhead to an organization. Once a device malfunction has been reported, someone has to manually go to the device and perform triage to determine a root cause of the malfunction. The triage may typically be performed by a service technician who is being paid at the prevailing rate for a service technician. The time and success of the service call is 100% dependent on the experience and expertise of the service technician. Some embodiments may advantageously reduce or eliminate manual processes, leverage automation, and reduce how many personnel are involved for service and/or commissioning of security devices/assets.

Some embodiments of a service and commissioning module may be implemented as a bolt-on software application that may be used with most or all access control systems. Some embodiments may provide a simple software interface that may prompt a user through performing a commissioning or service task, connect natively to the device being tested or serviced, and/or create an automated audit trail for all tasks performed.

Some embodiments may utilize a user interface that may be customized to commissioning or service tasks, and allow an end user to simply be prompted through the tasks required. Some embodiments may allow someone with less experience, and a lower pay scale, to perform the tasks required to commission or perform basic service triage. The results achieved from these tasks may either update the facility representative (e.g., pass) or create a service ticket to allow a service technician/installer to go directly to the failed component that needs to be replaced.

Figure 5:
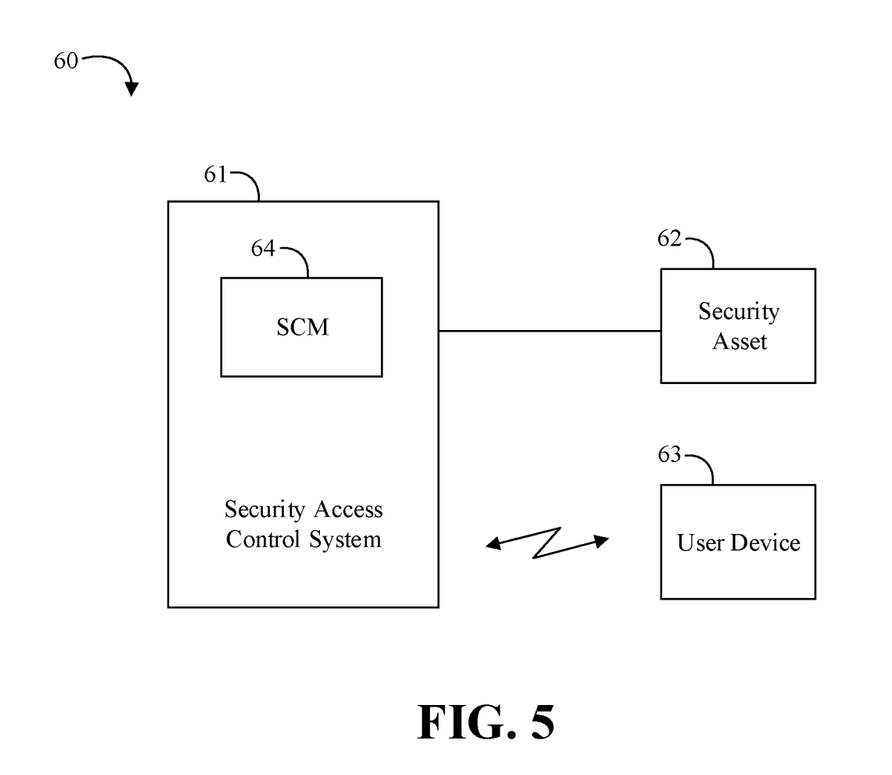
FIG. 5 is a block diagram of an example of a security environment according to an embodiment.

Turning now to FIG. 5, an embodiment of a security environment 60 may include a security access control system 61 communicatively coupled to a security asset 62 (e.g., wired or wirelessly), and a user device 63 (e.g., smartphone, tablet, laptop, etc.) communicatively coupled to one or more of the security access control system 61 and the security asset 62 (e.g., wired or wirelessly). For example, the system 61 may include an SCM 64 which stores commissioning and/or service tasks. The system 61 may identify the security asset 62 and then retrieve appropriate tasks to be performed by a user. The tasks may then be displayed on the user device 63 (e.g., as a list or one at a time, with graphical illustrations and/or video demonstrations, etc.). For example, the user device 63 may run an application that guides the user through the needed tasks for commissioning, triaging, and/or servicing the security asset 62. The SCM 64 may audit the tasks performed by the user (e.g., based on feedback from the security asset 62 and/or user device 63) and either place the security asset 62 into service or open a ticket for further attention by a technician or security personnel.

Figure 6:
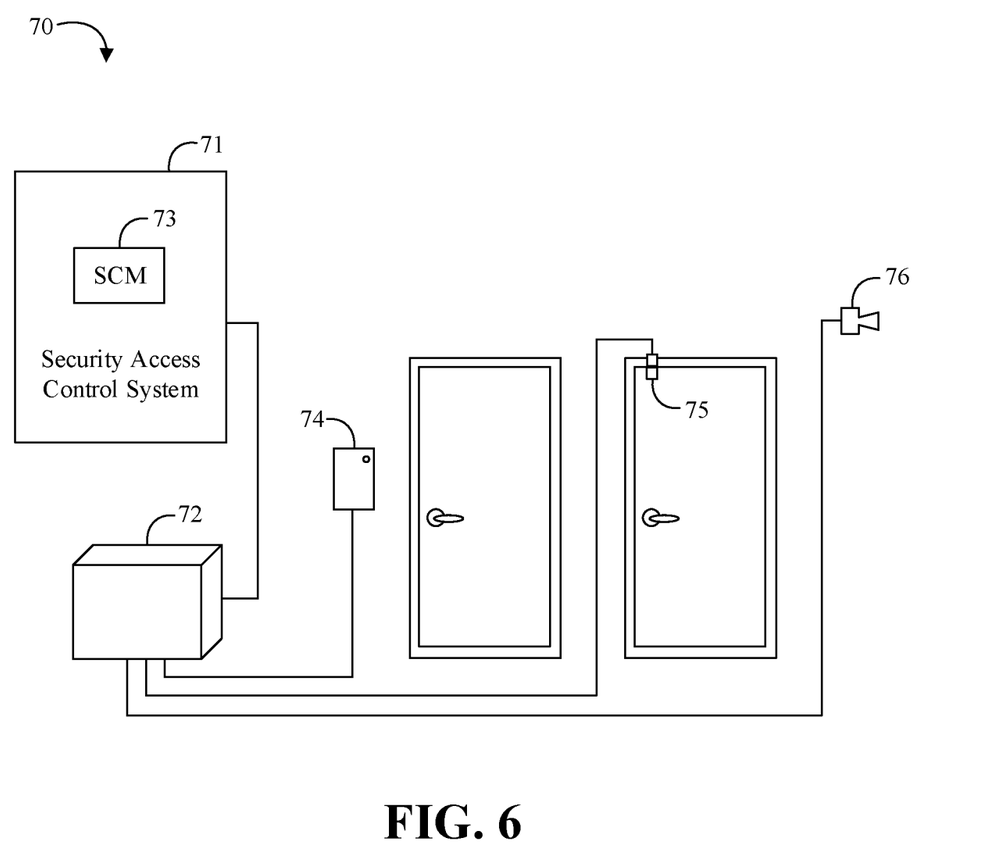
FIG. 6 is a block diagram of another example of a security environment according to an embodiment.

Turning now to FIG. 6, an embodiment of a security environment 70 may include a security access control system 71 communicatively coupled to a security control panel 72. The system 71 may include an embodiment of a SCM 73. The security control panel 72 may be communicatively coupled to multiple security assets including, for example, a card reader 74, a door alarm 75, and a local sounder 76. Typically, conventional testing is done through the use of the user interface of the security access control system 71. This approach, however, is limited in functionality because the user interface is designed to configure devices and monitor alarms and events. In some installations, the security control panel 72 that manages the field devices may have two ports. The first port may be for normal communication and updates and the second port may be used to establish initial communication and start the panel, or re-establish communication if the panel data becomes corrupted.

Some embodiments of the SCM 73 may leverage the second port to interact directly with devices without impacting normal communications the panel 72 has with the security access control system 71. For example, through the use of user interfaces that may be customized to commissioning or service, the SCM 73 may allow an end user to simply be prompted through the tasks required. Some embodiments may allow someone with less experience, and a lower pay scale, to perform the tasks required to commission or perform basic service triage. The results achieved from these tasks may either update the facility representative (e.g., a pass condition) or create a service ticket to allow a service technician/installer to go directly to the failed component that needs to be replaced.

Security Self Service Examples

Some embodiments may advantageously provide a security self-service enrollment module (SSEM). For example, some embodiments may provide a software suite that allows the self-capture and upload of identification photos (e.g., for badges, driver's licenses, passports, etc.) and/or biometric templates. The software suite may include applications or 'apps' that run on a user device (e.g., IOS or ANDROID apps that run on a smartphone, tablet, etc.). Conventionally, a person may need to go to an issuing authority (e.g., a central badge office, a post office, a motor vehicles department, etc.) where conventional applications are deployed to capture photos and biometric templates. This approach is expensive because organizations need to staff numerous badge offices. Additionally, some organizations are geographically disbursed making it difficult or impossible for employees to travel to a staffed location.

As the security industry continues to evolve it becomes increasingly difficult to manage enrolling workers images and biometric templates. The traditional approach of having an individual go to a badge office may no longer be sustainable for some organizations with changing numbers of workers and/or geographically disbursed worker populations. Some embodiments may advantageously provide a software suite that enables self-enrollment of workers and automatic updates to existing photo and biometric templates. For examples, some embodiments may provide a software suite that organizations can use to provide self-service image and biometric end-to-end functionality for user identification. Some embodiments may be implemented as IOS and ANDROID application(s) that allow(s) the capture of a photo (e.g., a selfie) and biometric templates with the user's device (e.g., which may include a front-facing camera, a fingerprint reader, a facial identification reader, etc.). The captured information may then be uploaded to the security access control system for processing.

In some embodiments, IOS or ANDROID compatible software may allow a user to capture selfie images and enroll a biometric template. Some embodiments may guide the user to capture a selfie that will allow the capture of an image that meets passport or badging requirements by leveraging biometric facial data to correctly crop the selfie to the correct size and orientation for its intended purpose. Some embodiments may also include background removal software so that the selfie image may have all the background removed, or the background color may be replaced to meet the intent of the photo use.

Some embodiments of a security self-service enrollment module may also provide a suite of services that will allow an individual to capture images for use on badge or passport photos, enroll biometric templates, and upload the data to the access control system. Some embodiments may advantageously enable printing or reprinting of identification badges, printing of passport photos, and/or the enrollment or update to existing biometric templates. Some embodiments of software utilized to correctly size and crop the selfie image may also be leveraged to create biometric facial templates. Some embodiments may include any suitable biometric technology to create other biometric templates (e.g., fingerprint, iris, deep vein palm mapping, etc.).

After the images and templates are created, some embodiments of the application may allow the end user to choose the actions they want to take. For example, such actions may include uploading the information and requesting a new or replacement badge, uploading and replacing an existing biometric template, etc. By adding pertinent data elements, the transaction may identify the individual and allow a secured transaction to take place to upload data to the individual's access control profile. For example, the transaction may be placed in a queue and the individual may be sent a onetime password to authenticate the transaction before it is processed.

After authenticated approval, the access control system may process the transaction, updating or adding biometric templates, and placing passport images and badge requests in a queue where a central badge office can print the badge or passport photos and send back to the requestor. In some embodiments, the badge printing may be automated as well.

Security Area Owner Management Examples

Some embodiments may advantageously provide a security area owner management module (AOM). Traditionally, a security organization has been looked to as the organization's "police department," providing physical controls, centralized monitoring, patrol dispatch and investigative services. In traditional access control systems, the security organization manages all aspects of an area (e.g., room) owner's business for the owner. For example, the security organization manages all the device configuration settings and alarm/event processing on the area/room owner's behalf. However, such configuration settings may become incorrect because the owners do not submit change requests. The security organization may receive excessive events and alarms because of incorrect device settings. The security organization generally does not do any validation on making changes if requested by an owner, so they do not provide any service other than the overhead of doing data entry.

As an organization becomes larger and more disbursed this model may no longer be sustainable for some organizations. Budget pressure may dictate less staffing and force some security organizations to prioritize what they can support. The reality may be in direct conflict of the customer's perception that security is managing, monitor and respond to alarms in their secured locations real time.

In some organizations, security may be responsible for building perimeters and critical infrastructure. But, the individual area owners may need to take a more active role in managing their own area's security. Some embodiments may advantageously provide a room or area owner access to the security system to manage their own environment and business needs. For example, an embodiment of an AOM may allow an area (e.g., room) owner access to the data elements to manage their own area/room security profile. An embodiment of an AOM may allow the area and room owners controlled access to the security system and allow them the ability to manage relevant attributes of their security components. Access to their data may be controlled through, for example, Active Directory, Access Governance approval and location based access to data.

Advantageously, some embodiments may help device configuration settings to be kept current, which may reduce alarms and events. In some embodiments, efficiency may be improved by owners doing updates directly instead of requesting the same through the security organization. Some embodiments may enable the ability for owners to manage and promote their own alarms further removing overhead from the security organization.

Some embodiments of an AOM may be implemented using responsive design techniques so the owner's interface to the AOM may run on a desktop or mobile device. The desktop version may be accessed through a security portal, while the mobile application may be ANDROID and IOS compatible and downloaded as part of a mobile security application. After the application is launched the area owner may see all, and only, the areas/rooms they own. By selecting an area/room, the area owner may see all of the security devices associated to that room. When an area owner opens a device, they may have limited, but relevant access to attributes and settings. For example, not all attributes may be exposed due to the risk of rendering a device inoperable.

In some embodiments, managing a card reader will allow the owner to manage one or more attributes including, for example, access behavior, event configurations, and/or action messages. Access behavior may include, for example, door unlock time (e.g., how long a door is unlocked on entry and exit), handicap extended unlock time (e.g., additional time for handicap access), door ajar delay (e.g., time a door can be left in an open before it alarms), schedules, and free access schedule (e.g., times and days of week the door is unlocked). Event configuration attributes may include, for example, door ajar configurations (e.g., alarm routing notification #1, days and times they will be notified; alarm routing notification #2, days and times they will be notified; alarm routing notification #3, days and times they will be notified; alarm routing notification escalation to security, days and times they will be notified; etc.). Associated action message attributes may include, for example, instructions for action to take on a door ajar alarm, sounder control (e.g., on the door ajar alarm, should the sounder go off, days and times), and camera control (e.g., on the door ajar alarm, with 1 minute of archived video being transmitted).

In some embodiments, event configuration attributes may also include door forced open configurations (e.g., alarm routing notification #1, days and times they will be notified; alarm routing notification #2, days and times they will be notified; alarm routing notification #3, days and times they will be notified; alarm routing notification escalation to security, days and times they will be notified; etc.). Associated action messages attributed may include instructions for action to take on a door forced open alarm, sounder control (e.g., on the door forced open alarm, should the sounder go off, days and times), and camera control (e.g., on the door forced open alarm, with 1 minute of archived video being transmitted).

In some embodiments, managing an alarm input (e.g., a door alarm) may allow the owner to manage one or more attributes including, for example, event configuration and action message attributes. Event configuration attributes may include an abnormal attribute (e.g., alarm routing notification #1, days and times they will be notified; alarm routing notification #2, days and times they will be notified; alarm routing notification #3, days and times they will be notified; alarm routing notification escalation to security, days and times they will be notified; etc.). Associated action message may include instructions for action to take on a door alarm, sounder control (e.g., on the door alarm, should the sounder go off, days and times), and camera control (e.g., on the door alarm, with 1 minute of archived video being transmitted).

In addition to configuring the attributes associated to devices, in some embodiments an area owner may also have the capability to control devices. Controlling a card reader may allow the owner to control one or more attributes including, for example, unlock the door momentarily, unlock the door and leave unlocked, and relock the door. Controlling an input may allow the owner to control one or more attributes including, for example, enable and/or disable. Controlling an output may allow the owner to control one or more attributes including, for example, enable, disable, activate, activate and hold, and deactivate.

Figure 7:
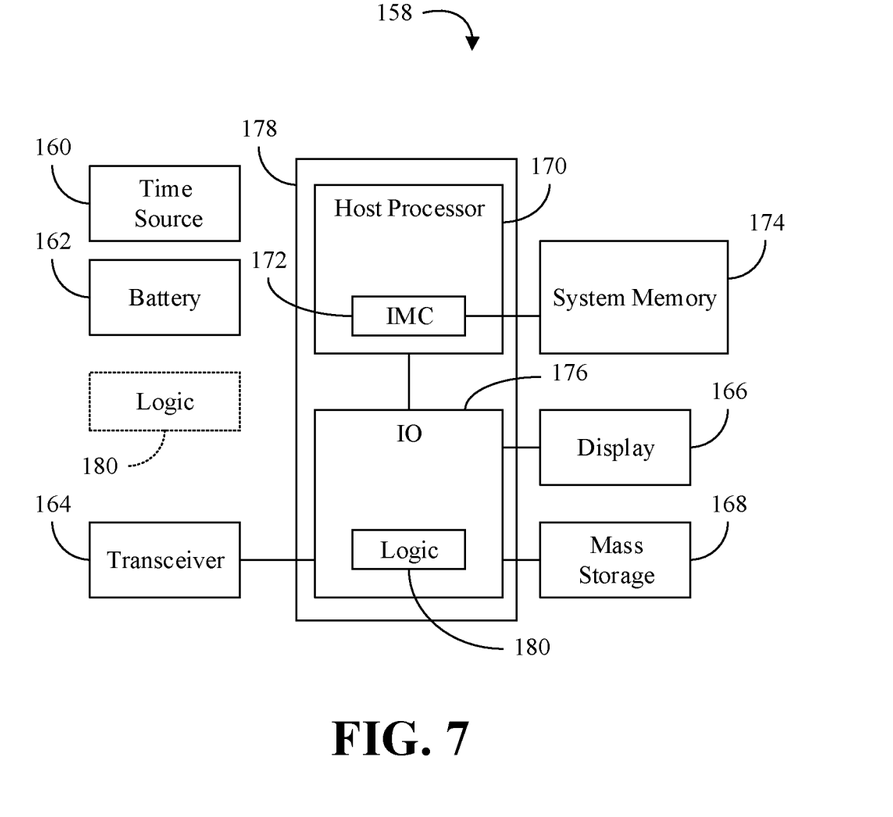
FIG. 7 is a block diagram of an example of a computing device according to an embodiment.

FIG. 7 shows a computing device 158 that may be readily substituted for one or more of the electronic processing system 10 (FIG. 1), the apparatus 20, various modules of the system 45 (FIG. 4), components of the environment 60 (FIG. 5), and/or components of the environment 70 (FIG. 6), already discussed. In the illustrated example, the device 158 includes a time source 160 (e.g., crystal oscillator, clock), a battery 162 to supply power to the device 158, a transceiver 164 (e.g., wireless or wired), a display 166 and mass storage 168 (e.g., hard disk drive/HDD, solid state disk/SSD, optical disk, flash memory). The device 158 may also include a host processor 170 (e.g., CPU) having an integrated memory controller (IMC) 172, which may communicate with system memory 174. The system memory 174 may include, for example, dynamic random access memory (DRAM) configured as one or more memory modules such as, for example, dual inline memory modules (DIMMs), small outline DIMMs (SODIMMs), etc. The illustrated device 158 also includes an input output (IO) module 176 implemented together with the processor 170 on a semiconductor die 178 as a system on chip (SoC), wherein the IO module 176 functions as a host device and may communicate with, for example, the display 166, the transceiver 164, the mass storage 168, and so forth. The mass storage 168 may include non-volatile memory (NVM) that stores one or more keys (e.g., MAC generation keys, encryption keys).

The IO module 176 may include logic 180 that causes the semiconductor die 178 to operate as a SCM, SSEM, and/or AOM, such as, for example, the electronic processing system 10 (FIG. 1), the apparatus 20, various modules of the system 45 (FIG. 4), components of the environment 60 (FIG. 5), and/or components of the environment 70 (FIG. 6). Thus, the logic 180 may establish communication with a security asset, establish communication with a security access control system, retrieve one or more tasks from the security access control system to one of commission or service the security asset, and guide a user to perform the one or more tasks. For example, the logic 180 may be configured to provide a user interface to visually display information related to the one or more tasks, and prompt the user to perform the one or more tasks with the user interface.

In some embodiments, the logic 180 may additionally, or alternatively, be configured to prompt the user to collect personal identification information, and store the collected user identification information at the security access control system. For example, the personal identification information may include one or more of image information (e.g., a selfie) and/or biometric information (e.g., fingerprint information, facial identification information, etc.). In some embodiments, the logic 180 may additionally, or alternatively, be configured to identify an owner for a security area, expose one or more attributes of the security area for management by the owner, and provide a user interface for the owner to modify the one or more attributes of the security area. For example, the one or more attributes may include one or more of access behaviors, event configurations, and action messages. In one example, the time source 160 is autonomous/independent from the controller in order to enhance security (e.g., to prevent the controller from tampering with cadence, frequency, latency and/or timestamp data). The logic 180 may also be implemented elsewhere in the device 158.

Figure 8:
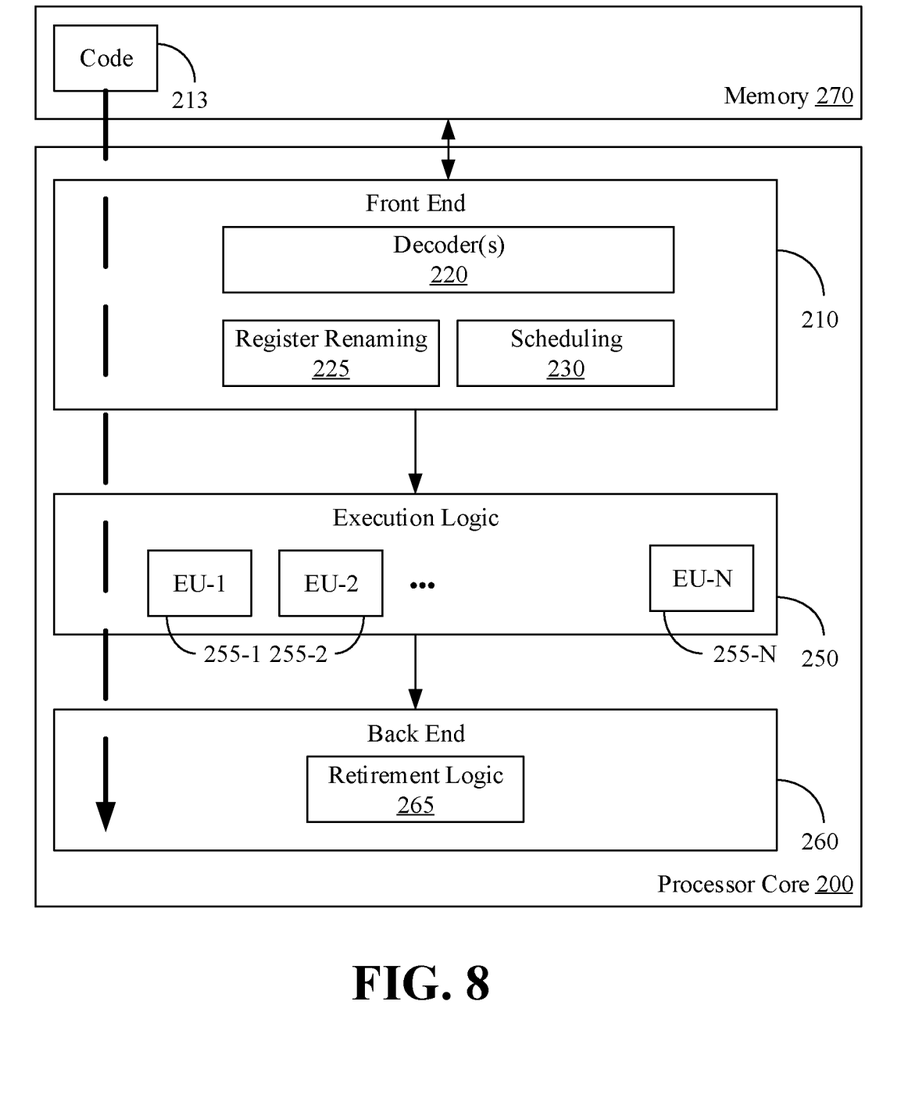
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIGS. 3A to 3C), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 9:
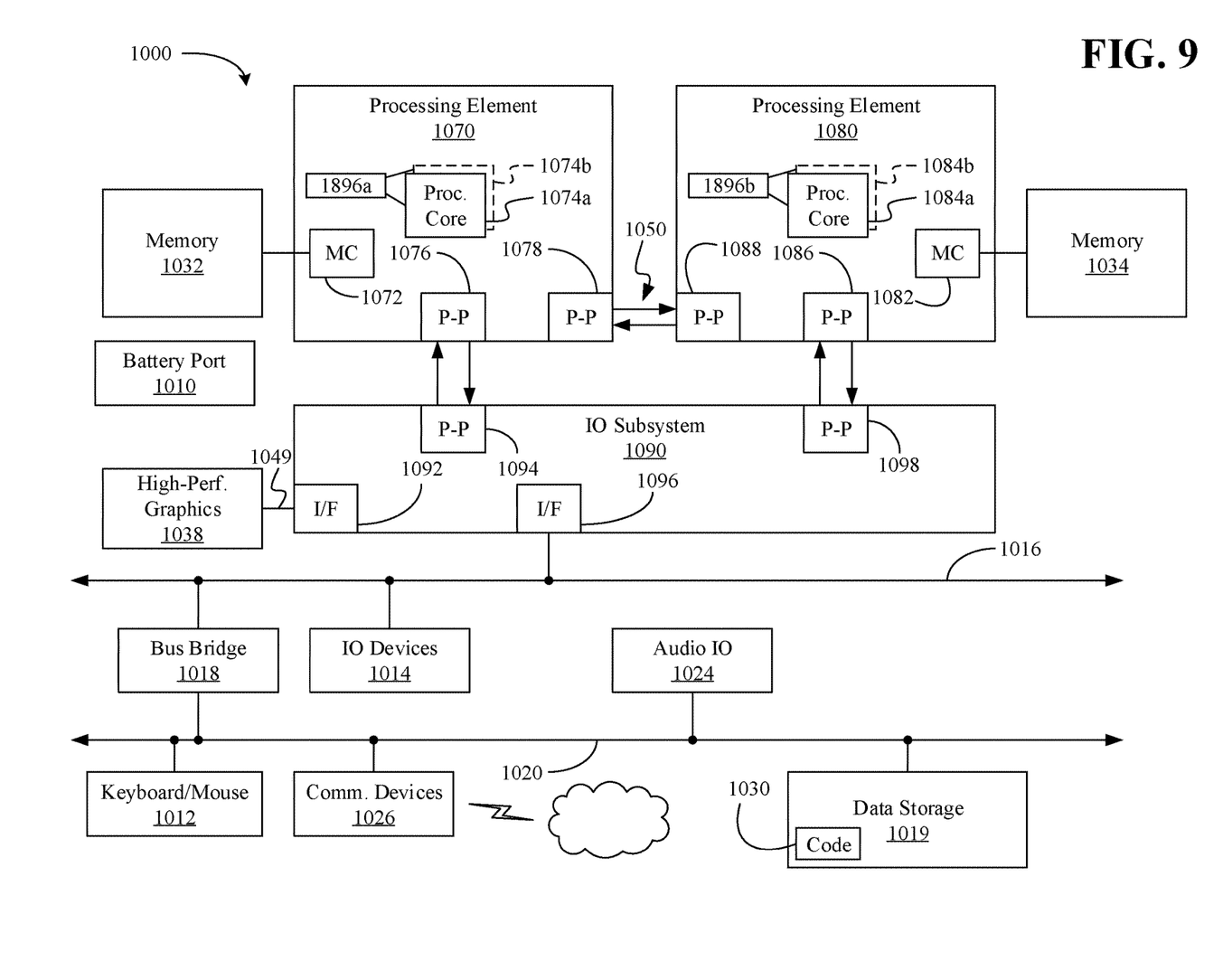
FIG. 9 is a block diagram of an example of a computing system according to an embodiment.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments is not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIGS. 3A to 3C), already discussed, and may be similar to the code 213 (FIG. 8), already discussed. Further, an audio I/O 1024 may be coupled to second bus 1020 and a battery port 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

ADDITIONAL NOTES AND EXAMPLES

Example 1 may include an electronic processing system, comprising a processor, memory communicatively coupled to the processor, and logic communicatively coupled to the processor to establish communication with a security asset, establish communication with a security access control system, retrieve one or more tasks from the security access control system to one of commission or service the security asset, and guide a user to perform the one or more tasks.

Example 2 may include the system of Example 1, wherein the logic is further to provide a user interface to visually display information related to the one or more tasks, and prompt the user to perform the one or more tasks with the user interface.

Example 3 may include the system of Example 2, wherein the logic is further to prompt the user to collect personal identification information, and store the collected user identification information at the security access control system.

Example 4 may include the system of Example 3, wherein the personal identification information includes one or more of image information and biometric information.

Example 5 may include the system of Example 2, wherein the logic is further to identify an owner for a security area, expose one or more attributes of the security area for management by the owner, and provide a user interface for the owner to modify the one or more attributes of the security area.

Example 6 may include the system of Example 5, wherein the one or more attributes includes one or more of access behaviors, event configurations, and action messages.

Example 7 may include a semiconductor package apparatus, comprising one or more substrates, and logic coupled to the one or more substrates, wherein the logic is at least partly implemented in one or more of configurable logic and fixed-functionality hardware logic, the logic coupled to the one or more substrates to establish communication with a security asset, establish communication with a security access control system, retrieve one or more tasks from the security access control system to one of commission or service the security asset, and guide a user to perform the one or more tasks.

Example 8 may include the apparatus of Example 7, wherein the logic is further to provide a user interface to visually display information related to the one or more tasks, and prompt the user to perform the one or more tasks with the user interface.

Example 9 may include the apparatus of Example 8, wherein the logic is further to prompt the user to collect personal identification information, and store the collected user identification information at the security access control system.

Example 10 may include the apparatus of Example 9, wherein the personal identification information includes one or more of image information and biometric information.

Example 11 may include the apparatus of Example 7, wherein the logic is further to identify an owner for a security area, expose one or more attributes of the security area for management by the owner, and provide a user interface for the owner to modify the one or more attributes of the security area.

Example 12 may include the apparatus of Example 11, wherein the one or more attributes includes one or more of access behaviors, event configurations, and action messages.

Example 13 may include the apparatus of any of Examples 7 to 12, wherein the logic coupled to the one or more substrates includes transistor channel regions that are positioned within the one or more substrates.

Example 14 may include a method of managing a security asset, comprising establishing communication with a security asset, establishing communication with a security access control system, retrieving one or more tasks from the security access control system to one of commission or service the security asset, and guiding a user to perform the one or more tasks.

Example 15 may include the method of Example 14, further comprising providing a user interface to visually display information related to the one or more tasks, and prompting the user to perform the one or more tasks with the user interface.

Example 16 may include the method of Example 15, further comprising prompting the user to collect personal identification information, and storing the collected user identification information at the security access control system.

Example 17 may include the method of Example 16, wherein the personal identification information includes one or more of image information and biometric information.

Example 18 may include the method of Example 14, further comprising identifying an owner for a security area, exposing one or more attributes of the security area for management by the owner, and providing a user interface for the owner to modify the one or more attributes of the security area.

Example 19 may include the method of Example 18, wherein the one or more attributes includes one or more of access behaviors, event configurations, and action messages.

Example 20 may include at least one computer readable storage medium, comprising a set of instructions, which when executed by a computing device, cause the computing device to establish communication with a security asset, establish communication with a security access control system, retrieve one or more tasks from the security access control system to one of commission or service the security asset, and guide a user to perform the one or more tasks.

Example 21 may include the at least one computer readable storage medium of Example 20, comprising a further set of instructions, which when executed by the computing device, cause the computing device to provide a user interface to visually display information related to the one or more tasks, and prompt the user to perform the one or more tasks with the user interface.

Example 22 may include the at least one computer readable storage medium of Example 21, comprising a further set of instructions, which when executed by the computing device, cause the computing device to prompt the user to collect personal identification information, and store the collected user identification information at the security access control system.

Example 23 may include the at least one computer readable storage medium of Example 22, wherein the personal identification information includes one or more of image information and biometric information.

Example 24 may include the at least one computer readable storage medium of Example 20, comprising a further set of instructions, which when executed by the computing device, cause the computing device to identify an owner for a security area, expose one or more attributes of the security area for management by the owner, and provide a user interface for the owner to modify the one or more attributes of the security area.

Example 25 may include the at least one computer readable storage medium of Example 24, wherein the one or more attributes includes one or more of access behaviors, event configurations, and action messages.

Example 26 may include a security asset manager apparatus, comprising means for establishing communication with a security asset, means for establishing communication with a security access control system, means for retrieving one or more tasks from the security access control system to one of commission or service the security asset, and means for guiding a user to perform the one or more tasks.

Example 27 may include the apparatus of Example 26, further comprising means for providing a user interface to visually display information related to the one or more tasks, and means for prompting the user to perform the one or more tasks with the user interface.

Example 28 may include the apparatus of Example 27, further comprising means for prompting the user to collect personal identification information, and means for storing the collected user identification information at the security access control system.

Example 29 may include the apparatus of Example 28, wherein the personal identification information includes one or more of image information and biometric information.

Example 30 may include the apparatus of Example 26, further comprising means for identifying an owner for a security area, means for exposing one or more attributes of the security area for management by the owner, and means for providing a user interface for the owner to modify the one or more attributes of the security area.

Example 31 may include the apparatus of Example 30, wherein the one or more attributes includes one or more of access behaviors, event configurations, and action messages.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
 a processor;
 memory communicatively coupled to the processor; and
 logic communicatively coupled to the processor to:
  establish communication with a security asset,
  establish communication with a security access control system, wherein the security access control system includes a security management system communicatively coupled with multiple business modules including a human accounts module, a training module, and other business systems modules to coordinate cooperation between two or more of the multiple business modules,
  retrieve, via a service and commissioning module communicatively coupled to the security management system, one or more tasks from the security access control system as coordinated by the security management system to one of commission or service the security asset, and
  guide a user to perform the one or more tasks to commission or service the security asset using the service and commissioning module,
  wherein the service and commissioning module further includes a user interface to:
   prompt a user through performing a commissioning or service task,
   connect natively to a security asset being tested or serviced, and
   create an automated audit trail for all tasks performed.

2. The system of claim 1, wherein the logic is further to:
 visually display, via the user interface, information related to the one or more tasks; and
 prompt the user to perform the one or more tasks with the user interface.

3. The system of claim 2, wherein the logic is further to:
 prompt the user to collect personal identification information; and
 store the collected user identification information at the security access control system.

4. The system of claim 3, wherein the personal identification information includes one or more of image information and biometric information.

5. The system of claim 2, wherein the logic is further to:
 identify an owner for a security area;
 expose one or more attributes of the security area for management by the owner; and
 provide a user interface for the owner to modify the one or more attributes of the security area.

6. The system of claim 5, wherein the one or more attributes includes one or more of access behaviors, event configurations, and action messages.

7. A semiconductor package apparatus, comprising:
 one or more substrates; and
 logic coupled to the one or more substrates, wherein the logic is at least partly implemented in one or more of configurable logic and fixed-functionality hardware logic, the logic coupled to the one or more substrates to:
  establish communication with a security asset,
  establish communication with a security access control system, wherein the security access control system includes a security management system communicatively coupled with multiple business modules including a human accounts module, a training module, and other business systems modules to coordinate cooperation between two or more of the multiple business modules,
  retrieve, via a service and commissioning module communicatively coupled to the security management system, one or more tasks from the security access control system as coordinated by the security management system to one of commission or service the security asset, and
  guide a user to perform the one or more tasks to commission or service the security asset using the service and commissioning module,
  wherein the service and commissioning module further includes a user interface to:
   prompt a user through performing a commissioning or service task,
   connect natively to a security asset being tested or serviced, and
   create an automated audit trail for all tasks performed.

8. The apparatus of claim 7, wherein the logic is further to:
 provide a user interface to visually display, via the user interface, information related to the one or more tasks; and
 prompt the user to perform the one or more tasks with the user interface.

9. The apparatus of claim 8, wherein the logic is further to:
 prompt the user to collect personal identification information; and
 store the collected user identification information at the security access control system.

10. The apparatus of claim 9, wherein the personal identification information includes one or more of image information and biometric information.

11. The apparatus of claim 7, wherein the logic is further to:
 identify an owner for a security area;
 expose one or more attributes of the security area for management by the owner; and
 provide a user interface for the owner to modify the one or more attributes of the security area.

12. The apparatus of claim 11, wherein the one or more attributes includes one or more of access behaviors, event configurations, and action messages.

13. The apparatus of claim 7, wherein the logic coupled to the one or more substrates includes transistor channel regions that are positioned within the one or more substrates.

14. A method of managing a security asset, comprising:
 establishing communication with a security asset;
 establishing communication with a security access control system, wherein the security access control system includes a security management system communicatively coupled with multiple business modules including a human accounts module, a training module, and other business systems modules to coordinate cooperation between two or more of the multiple business modules;

retrieving, via a service and commissioning module communicatively coupled to the security management system, one or more tasks from the security access control system as coordinated by the security management system to one of commission or service the security asset; and guiding a user to perform the one or more tasks to commission or service the security asset using the service and commissioning module, wherein the service and commissioning module further includes a user interface to:

prompting a user through performing a commissioning or service task, connecting natively to a security asset being tested or serviced, and creating an automated audit trail for all tasks performed.

15. The method of claim 14, further comprising:
visually displaying, via the user interface, information related to the one or more tasks; and
prompting the user to perform the one or more tasks with the user interface.

16. The method of claim 15, further comprising:
prompting the user to collect personal identification information; and
storing the collected user identification information at the security access control system.

17. The method of claim 16, wherein the personal identification information includes one or more of image information and biometric information.

18. The method of claim 14, further comprising:
identifying an owner for a security area;
exposing one or more attributes of the security area for management by the owner; and
providing a user interface for the owner to modify the one or more attributes of the security area.

19. The method of claim 18, wherein the one or more attributes includes one or more of access behaviors, event configurations, and action messages.

20. At least one non-transitory computer readable storage medium, comprising a set of instructions, which when executed by a computing device, cause the computing device to:

establish communication with a security asset;

establish communication with a security access control system, wherein the security access control system includes a security management system communicatively coupled with multiple business modules including a human accounts module, a training module, and other business systems modules to coordinate cooperation between two or more of the multiple business modules;

retrieve, via a service and commissioning module communicatively coupled to the security management system, one or more tasks from the security access control system as coordinated by the security management system to one of commission or service the security asset; and guide a user to perform the one or more tasks using the service and commissioning module, wherein the service and commissioning module further includes a user interface to:

prompt a user through performing a commissioning or service task, connect natively to a security asset being tested or serviced, and create an automated audit trail for all tasks performed.

21. The at least one non-transitory computer readable storage medium of claim 20, comprising a further set of instructions, which when executed by the computing device, cause the computing device to:
visually display, via the user interface, information related to the one or more tasks; and
prompt the user to perform the one or more tasks with the user interface.

22. The at least one non-transitory computer readable storage medium of claim 21, comprising a further set of instructions, which when executed by the computing device, cause the computing device to:
prompt the user to collect personal identification information; and
store the collected user identification information at the security access control system.

23. The at least one non-transitory computer readable storage medium of claim 22, wherein the personal identification information includes one or more of image information and biometric information.

24. The at least one non-transitory computer readable storage medium of claim 20, comprising a further set of instructions, which when executed by the computing device, cause the computing device to:
identify an owner for a security area;
expose one or more attributes of the security area for management by the owner; and
provide a user interface for the owner to modify the one or more attributes of the security area.

25. The at least one non-transitory computer readable storage medium of claim 24, wherein the one or more attributes includes one or more of access behaviors, event configurations, and action messages.

* * * * *